United States Patent
Kroo et al.

(10) Patent No.: US 10,281,890 B1
(45) Date of Patent: May 7, 2019

(54) AIRCRAFT CONTROL SYSTEM BASED ON SPARSE SET OF SIMULATION DATA

(71) Applicant: Kitty Hawk Corporation, Mountain View, CA (US)

(72) Inventors: Ilan Kroo, Portola Valley, CA (US); Marshall Gusman, Denver, CO (US); Neel Vora, San Mateo, CA (US); Jim Bungener, Whitefish, MT (US); Eric Allison, Mountain View, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 16/126,062

(22) Filed: Sep. 10, 2018

Related U.S. Application Data

(63) Continuation of application No. 15/838,790, filed on Dec. 12, 2017, now Pat. No. 10,101,719.

(51) Int. Cl.
| | | |
|---|---|---|
| *G05B 17/02* | (2006.01) | |
| *B64C 39/02* | (2006.01) | |
| *G05D 1/08* | (2006.01) | |
| *B64C 27/22* | (2006.01) | |

(52) U.S. Cl.
CPC .......... *G05B 17/02* (2013.01); *B64C 39/024* (2013.01); *G05D 1/0858* (2013.01); *B64C 27/22* (2013.01); *B64C 2201/042* (2013.01); *B64C 2201/14* (2013.01)

(58) Field of Classification Search
CPC .......... B64C 39/024; B64C 2201/042; B64C 2201/14; G05D 1/0825
See application file for complete search history.

(56) References Cited

U.S. PATENT DOCUMENTS

| | | |
|---|---|---|
| 6,092,919 A | 7/2000 | Calise |
| 6,317,658 B1 | 11/2001 | Vian |
| 8,131,408 B2 | 3/2012 | Kordt |
| 2018/0305033 A1* | 10/2018 | Joubert .............. B64D 27/24 |

OTHER PUBLICATIONS

Fu Zhang, Modeling and Flight Control Simulation of A Quad Rotor Tail-Sitter VTOL UAV, Jan. 13, 2017, AIAA Modeling and Simulation Technologies Conference (Year: 2017).

(Continued)

*Primary Examiner* — Brian M O'Hara
(74) *Attorney, Agent, or Firm* — Van Pelt, Yi & James LLP

(57) ABSTRACT

A flight control system is disclosed. In various embodiments, a flight control system includes a data storage device configured to store an aerodynamic model; and a processor coupled to the data storage device and configured to use the aerodynamic model to determine a set of actuators and for each actuator in the set a corresponding set of one or more actuator parameters to achieve a desired set of forces and moments. The aerodynamic model provides for each actuator in the set of actuator corresponding force and moment data for each of a first set of operating conditions based on a first set of simulations performed by varying one or more actuator parameters while holding other actuators at a baseline value and a second set of simulations to determine interactions between the actuator and said other actuators under each of a second set of operating conditions.

20 Claims, 6 Drawing Sheets

(56) References Cited

OTHER PUBLICATIONS

Guillaume Fillola, Numerical Simulations Around Wing Control Surfaces, 2004, 24th International Congress of the Aeronautical Sciences (Year: 2004).

Rudaba Khan, Active Fault Tolerant Flight Control System Design, Oct. 10, 2016, Department of Mathematics and Geospatial Science, RMIT University, Melbourne, Australia (Year: 2016).

* cited by examiner

AIRCRAFT CONTROL SYSTEM BASED ON SPARSE SET OF SIMULATION DATA

CROSS REFERENCE TO OTHER APPLICATIONS

This application is a continuation of co-pending U.S. patent application Ser. No. 15/838,790, entitled AIRCRAFT CONTROL SYSTEM BASED ON SPARSE SET OF SIMULATION DATA filed Dec. 12, 2017 which is incorporated herein by reference for all purposes.

BACKGROUND OF THE INVENTION

Aircraft control systems typically use aerodynamic models and/or data derived from such models to control aircraft actuators, such as propeller, lifts fans and other vertical flight rotors, ailerons, elevators, flaps, rudders, and the like during flight. The aerodynamic model represents the aircraft and its geometry, including actuators and their location relative to other structures; aerodynamic surfaces such as wings, tails, stabilizers, etc.; and the aerodynamic effect of other structures, such as the fuselage, pylons, etc.

Typically, aerodynamic models are generated through wind tunnel testing or computer simulation, such as computational fluid dynamics (CFD)-based simulation. However, wind tunnel testing is expensive and time consuming. It requires access to a wind tunnel and a prototype must be built to perform the testing. Wind tunnel testing through the range of operating conditions and aircraft states required to generate a complete model may be time consuming and expensive. CFD-based simulation does not require a wind tunnel, but even using parallel/distributed computing resources such simulations can take a considerable time to run to completion. For a complicated aircraft, for example, having many actuators, a single simulation may take three days to run on hundreds of processors. Thousands of such simulations may need to be run to generate an aerodynamic model that is comprehensive enough to provide a reliable flight control system.

BRIEF DESCRIPTION OF THE DRAWINGS

Various embodiments of the invention are disclosed in the following detailed description and the accompanying drawings.

DETAILED DESCRIPTION

Figure 1:
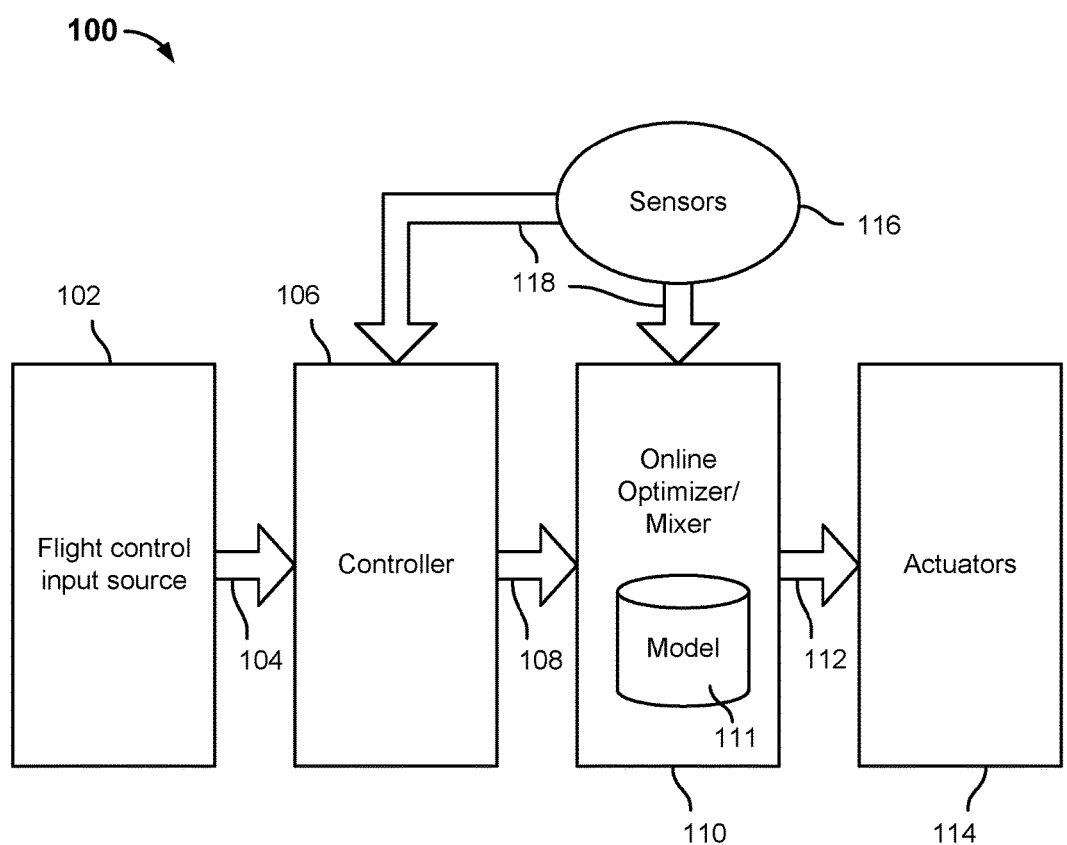
FIG. 1 is a block diagram chart illustrating an embodiment of a flight control system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A flight control system based at least in part on an aerodynamic model generated from a spare set of simulation data is disclosed. In various embodiments, a flight control system for an over-actuated electric vertical (and/or short) takeoff and landing (VTOL) aircraft is disclosed. The aircraft may be over-actuated in the sense that it has more actuators than minimally necessary to control flight, e.g., aircraft posture/attitude in three dimensional space, airspeed, etc.

In various embodiments, a flight control system as disclosed herein embodies and/or is based on data derived from a comprehensive aerodynamic model generated on a sparse set of simulation data. In some embodiments, simulations are performed for each of a plurality of actuators independently of one or more of the other actuators. For example, in some embodiments, each actuator is cycled through a range of actuator operating parameters (e.g., RPM in the case of an electric lift fan or other rotor) in a range of operating conditions (e.g., aircraft attitude, wind direction, etc.) while keeping other actuators constant. A baseline model is generated based on the per-actuator simulation data and is used in various embodiments to determine interactions between actuators for a very limited set of operating conditions. Interaction values for other operating conditions are determined by interpolation. The interaction terms are combined with the baseline model to generate a comprehensive aerodynamic model.

The comprehensive aerodynamic model in some embodiments is embodied in and/or used to provide a lookup table used by the flight control system to determine the effectiveness of actuators under given operating conditions and operational states of the respective actuators comprising the aircraft. In some embodiments, the flight control system uses the lookup table to determine an optimal set of actuators and associated parameters (e.g., RPM, angle, etc., as applicable)

to achieve a set of forces and moments determined to achieve an objective, e.g., to respond to inputs received via one or more manual flight control devices (inceptors), or other flight directives, such as inputs received from an auto-pilot.

FIG. 1 is a block diagram chart illustrating an embodiment of a flight control system. In various embodiments, the flight control system 100 of FIG. 1 is embodied in an electric VTOL aircraft. In the example shown, flight control system 100 includes a set of inceptors 102 configured to provide inceptor inputs 104 to a controller 106. In various embodiments, inceptors 102 may include manual input devices, such as stick, throttle, rudder, collective, joystick, thumb stick, and/or other manual control/input devices configured to be manipulated by a pilot or other operator to control the flight of an aircraft. Such inceptor devices and/or associated electronics may be configured to provide as input signals 104 one or more of a roll direction, roll rate, yaw direction, yaw rate, pitch angle, pitch rate, altitude, altitude rate and/or forward or other speed, position, and/or thrust input signal.

In the example shown, controller 106 also receives sensor data 118, e.g., air speed, air temperature, air static pressure, acceleration(s), angular rates, GPS information, camera or other image data, etc., from sensors 116. Examples of sensors 116 and/or sensor data 118 may include one or more of airspeed, temperature, or other environmental conditions; actuator availability, failure, and/or health information; aircraft attitude, altitude, and/or other position information; presence/absence of other aircraft, debris, or other obstacles in the vicinity of the aircraft; actuator position information; etc. Flight controller 106 translates, aggregates, and/or otherwise processes and/or interprets the received inceptor inputs 104 and/or sensor data 118 to generate and provide as output associated forces and/or moments 108 to be applied to the aircraft via its control assets (e.g., propellers, rotors, lift fans, aerodynamic control surfaces, and/or other actuators) to maneuver the aircraft in a manner determined based at least in part on the inceptor inputs 104 and/or sensor data 118. In various embodiments, forces/moments 108 may include forces and/or moments along and/or about one or more axes of the aircraft, such as x, y, and z axes, corresponding to longitudinal, transverse, and vertical axes of the aircraft, respectively, in various embodiments.

Referring further to FIG. 1, the flight control system 100 includes an online optimizer/mixer 110 configured to receive forces/moments 108 and sensor data 118 as inputs. Optimizer/mixer 110 receives as input forces/moments 108 and sensor data 118, and determines dynamically (in real time), based at least in part on aerodynamic model 111, an optimal set of actuators and associated commands/parameters 112 to achieve the desired forces and moments. In various embodiments, actuators 114 are configured to operate in response to actuator commands/parameters 112 provided by online optimizer/mixer 110.

In various embodiments, aerodynamic model 111 comprises a comprehensive aerodynamic model determined based on a sparse set of simulation data, as disclosed herein. In some embodiments, aerodynamic model 111 comprises a lookup table. For each of a plurality of actuators, aerodynamic model 111 provides for a given aircraft angle of attack α, side wind direction β, and desired force F and moment M a set of operating parameters required for the actuator, such as lift fan torque/speed (e.g., RPM). Online optimizer/mixer 110 uses the model 111 to determine a set of actuators and for each corresponding parameters to achieve the received forces/moments 108 under the given conditions (α, β).

Figure 2:
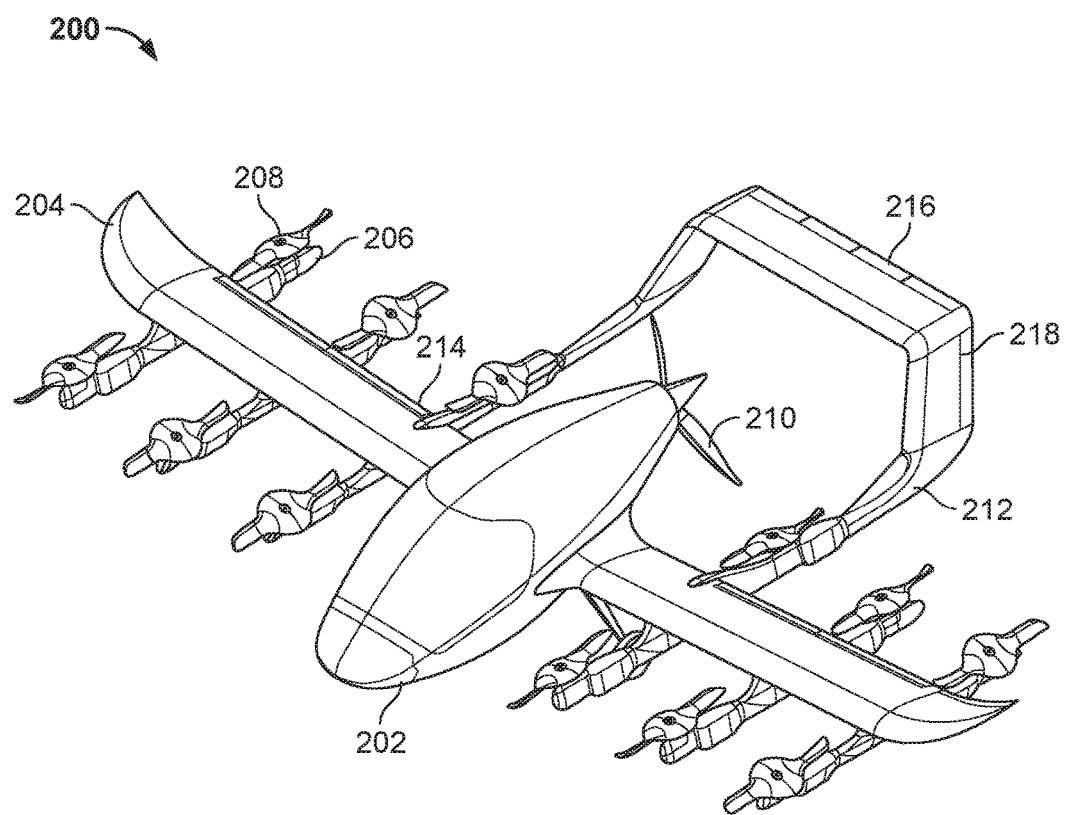
FIG. 2 is a diagram illustrating an embodiment of an electric VTOL aircraft.

FIG. 2 is a diagram illustrating an embodiment of an electric VTOL aircraft. In various embodiments, a flight control system such as flight control system 100 of FIG. 1 may be embodied in an aircraft such as aircraft 200 of FIG. 2. In the example shown, aircraft 200 includes a fuselage (body) 202 and wings 204. A set of three underwing booms 206 is provided under each wing. Each boom 206 has two lift fans 208 mounted thereon, one forward of the wing and one aft. Each lift fan 208 may be driven by an associated drive mechanism, such as a dedicated electric motor. One or more batteries (not shown) and/or onboard power generators (e.g., solar panels) may be used to drive the lift fans 208 and/or charge/recharge onboard batteries.

In the example shown in FIG. 2, propeller 210 is mounted on the fuselage 202 and configured to push the aircraft through the air in the forward (e.g., x axis) direction. The propeller 210 is positioned between a pair of booms 212 that extend aft and are joined at their aft end by a tail structure on which aerodynamic control surfaces including elevators 216 and rudder 218 are mounted. Additional control surfaces include ailerons 214 mounted on the trailing edge of wings 204.

In various embodiments, aircraft 200 includes a flight control system that embodies an aerodynamic model generated based on a sparse set of simulation results, as disclosed herein. For a given set of desired forces and moments, the flight control system uses the model to determine a set of actuators and for each a corresponding set of actuator parameters to achieve the desired forces and moments. For example, all or a subset of actuators such as the lift fans 208 and/or selected ones of them; propeller 210; and control surfaces such as ailerons 214, elevators 216, and/or rudders 218 may be selected, and for each an associated set of parameters determined and applied (e.g., a corresponding RPM, which equates to torque, for each lift fan 208 included in the mix; position angles for each selected control surface; etc.).

Figure 3:
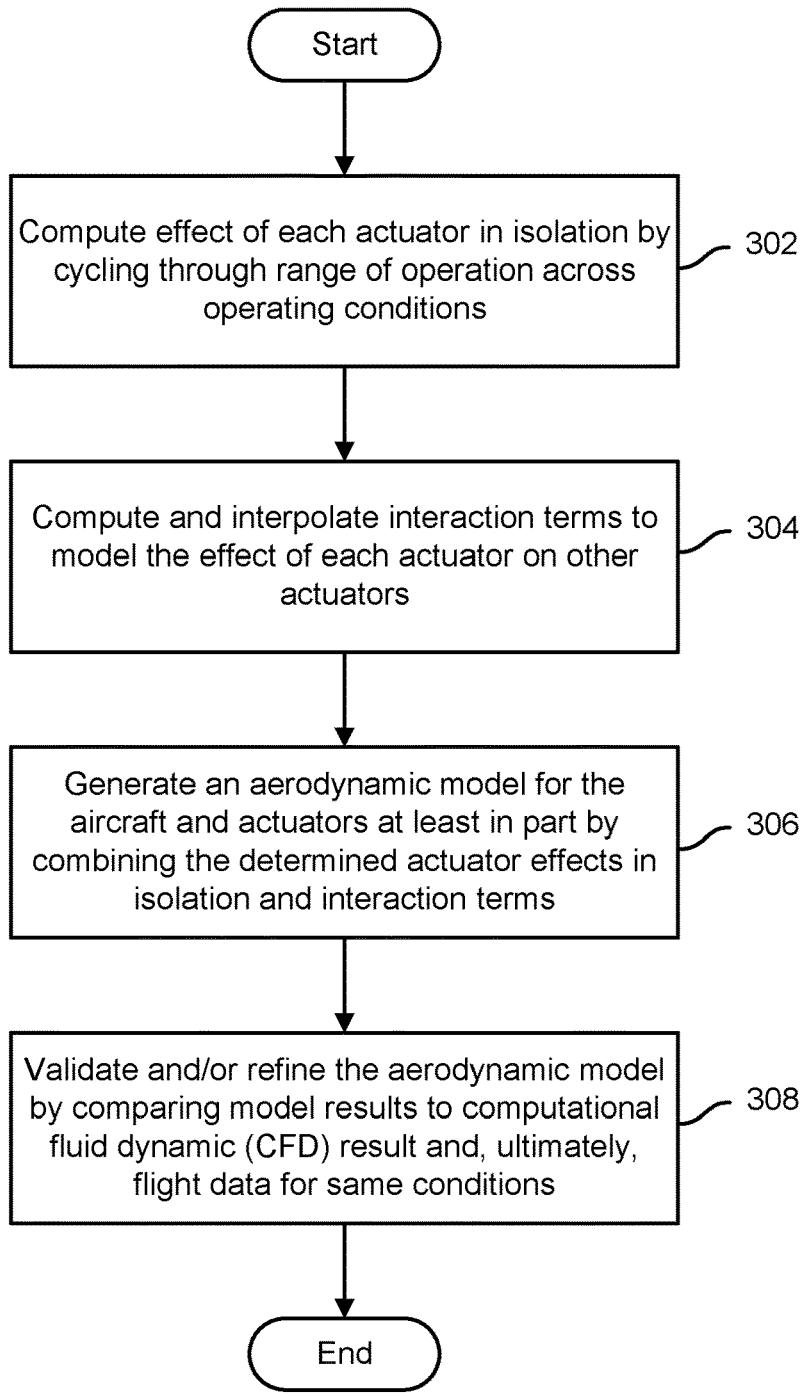
FIG. 3 is a flow chart illustrating an embodiment of a process to generate an aerodynamic model from sparse simulation data.

FIG. 3 is a flow chart illustrating an embodiment of a process to generate an aerodynamic model from sparse simulation data. In various embodiments, aerodynamic model 111 of FIG. 1 may be generated at least in part by performing the process of FIG. 3. In various embodiments, the process of FIG. 3 may be implemented by and/or using a general or special purpose computer, e.g., a computer comprising a processor and memory configured to store computer instructions which, when executed, cause the processor to perform one or more of the steps of the process shown in FIG. 3. In the example shown, the effect of each actuator (e.g., lift fan 208, etc.) is computed in isolation (302). For example, for each actuator, iterations of a computation fluid dynamics (CFD) simulation may be performed a different actuator parameter values (e.g., RPM) for each of plurality of operating conditions $\{\alpha_i, \beta_j\}$ while maintaining all other actuators at a baseline level. Interaction terms are determined for a limited set of operating conditions and interpolation is used to determine interaction terms at other points (304). For example, in some embodiments, for each actuator CFD simulations are performed to determine the effects of that actuator on other actuators under varying operating parameters (e.g., RPM) for a relatively very small set of operation conditions, such as two points $(\alpha_1, \beta_1)$ and $(\alpha_2, \beta_2)$. A comprehensive aerodynamic model is generated by combining the results of modeling each actuator independently of the others (302) with the determining interaction terms (304) to provide a combined model (306). The combined model is validated by comparing its predictions with corresponding CFD simulation results (308). In some embodiments, the validation may include adjusting the combined model to reflect, e.g., be more consistent with, the CFD simulation results.

Figure 4:
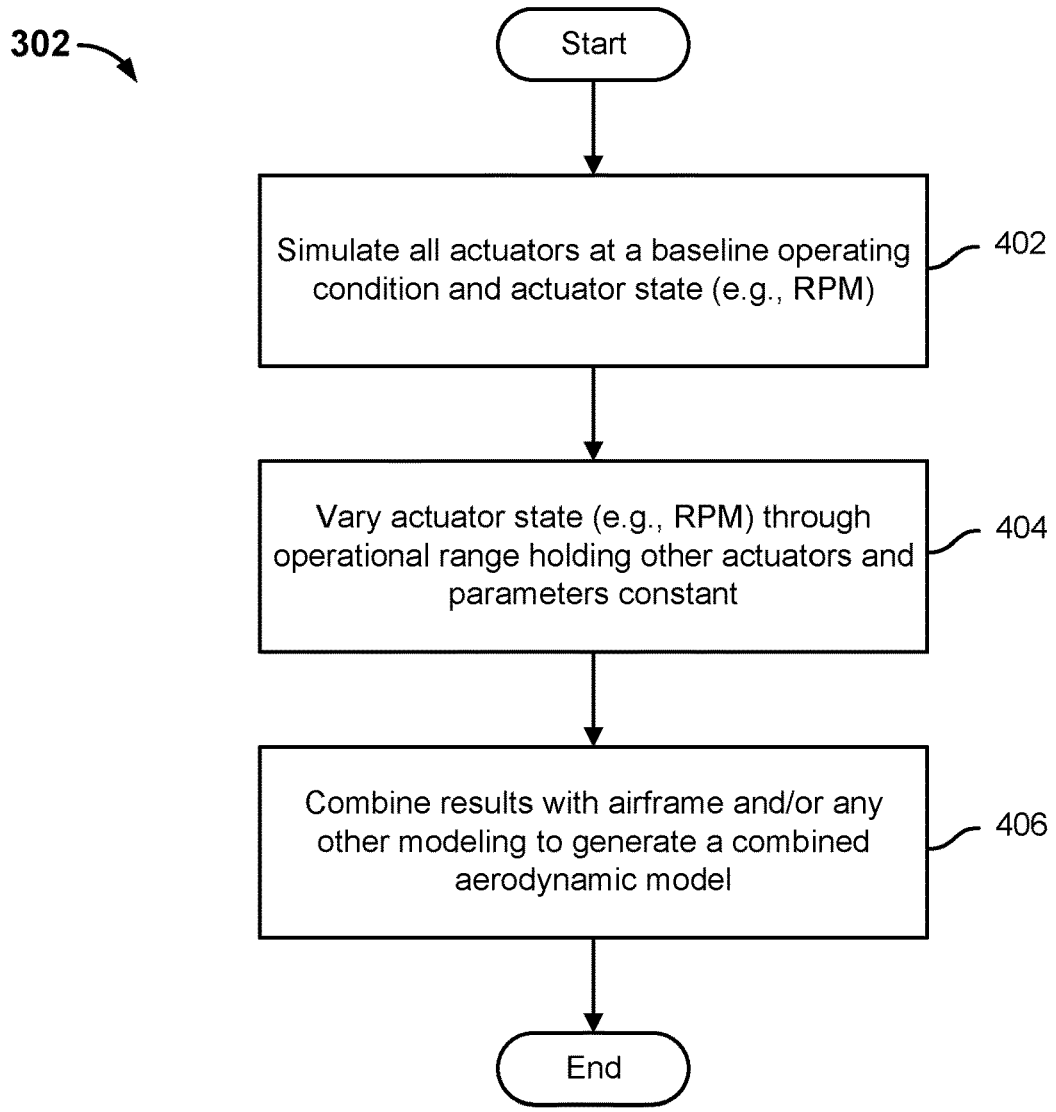
FIG. 4 is a flow chart illustrating an embodiment of a process to generate sparse simulation data.

FIG. 4 is a flow chart illustrating an embodiment of a process to generate sparse simulation data. In various embodiments, step 302 of FIG. 3 may be implemented at least in part by performing the process of FIG. 4. In the example shown, a baseline set of simulations is performed with all actuators operating at a baseline set of parameters, e.g., lift fan RPM (402). For each actuator, further simulations are performed by varying the operating parameter of that actuator while holding the others at the baseline level (404). The results of the simulations performed by cycling each actuator individually are combined with other model information (e.g., a fixed wing CFD simulation performed with respect to the airframe) to provide a combined aerodynamic model (406).

In some embodiments, a steady-state CFD solver software tool is used to define the airframe geometry (e.g., aircraft fuselage/body, wings, tail, etc.) and simulate airflow around the airframe. In some embodiments, a time-accurate solver software tool is used to perform CFD-based simulations for the actuators under various operating conditions and actuator parameters (e.g., RPM). In some embodiments, step 406 of FIG. 4 includes combining results obtained using the steady-state solver with respect to the airframe with results obtained using time-accurate solver to simulate operation of each actuator through a range of actuator parameters (e.g., RPM) in step 404.

Figure 5:
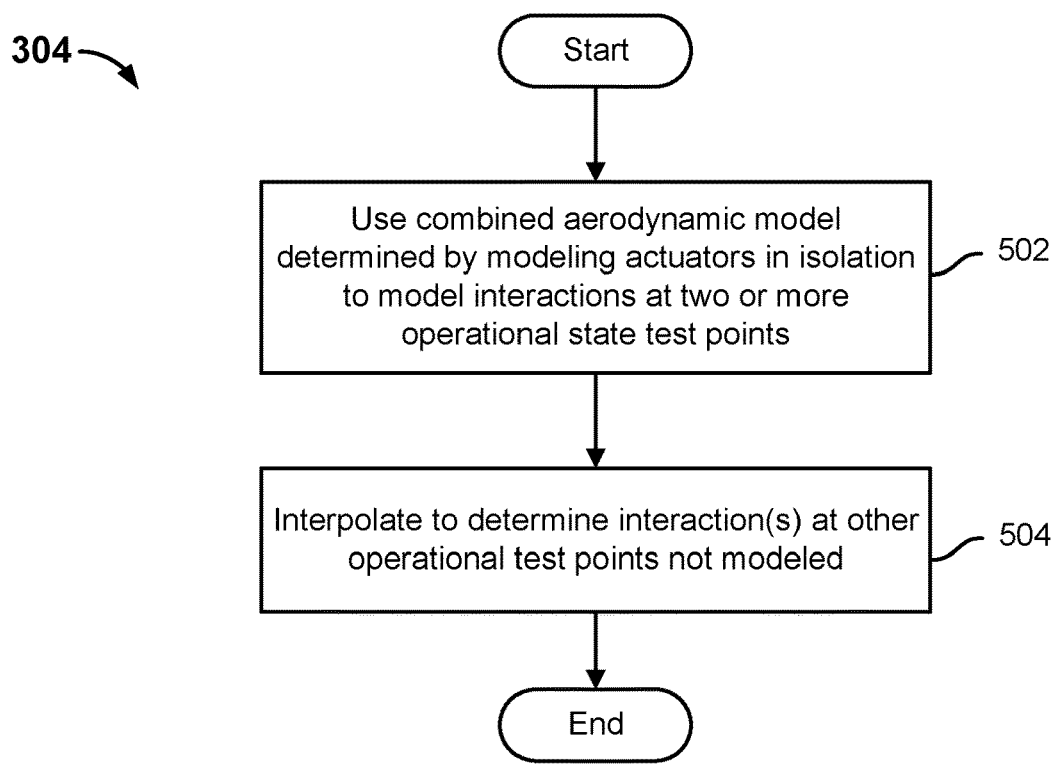
FIG. 5 is a flow chart illustrating an embodiment of a process to determine actuator interaction terms.

FIG. 5 is a flow chart illustrating an embodiment of a process to determine actuator interaction terms. In various embodiments, step 304 of FIG. 3 may be implemented at least in part by performing the process of FIG. 5. In the example shown, a combined simple aerodynamic model determined by simulating each actuator individually, in turn, through a range of actuator parameters while holding other actuators constant, as in step 302 of FIG. 3 and/or the process of FIG. 4, is used to model at relative very few (e.g., two or more) operating conditions ($\alpha_i$, $\beta_i$) interactions of each actuator with one or more (e.g., all) the other actuators and/or other structures comprising the aircraft (e.g., wing, etc.) (502). In some embodiments, simulations are performed at the lower and upper ends of a relatively narrow range of operating conditions expected to be encountered during flight except in exceptional conditions. Interpolation (extrapolation) is performed to determine interaction values for operating conditions not simulated (504). In some embodiments, linear interpolation (extrapolation) is used. In various embodiments, one or more techniques other than linear interpolation may be used, including without limitation piecewise approximation, fitting a non-linear curve, etc.

Figure 6:
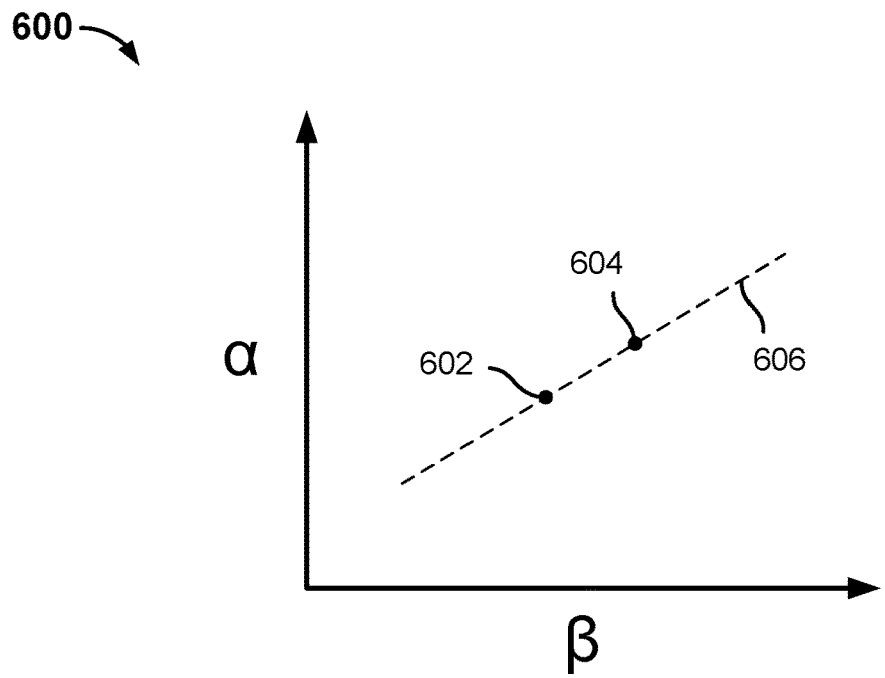
FIG. 6 is a diagram illustrating an embodiment of a process to determine actuator interaction terms.

FIG. 6 is a diagram illustrating an embodiment of a process to determine actuator interaction terms. In various embodiments, step 504 of FIG. 5 may be implemented by performing linear interpolation (extrapolation), as shown in FIG. 6. In the example shown, linear interpolation (extrapolation) is performed as illustrated by graph 600. Simulations were performed in this example at two operating points 602, 604, e.g., {($\alpha_1$, $\beta_1$), ($\alpha_2$, $\beta_2$)}, and a line 606 has been fitted to the points to enable interaction terms representing the effect of the actuator on other actuators and/or structures under operating conditions other than those simulated (602, 604).

In various embodiments, a comprehensive aerodynamic model is generated by combining the results of simulations performed by sweeping each actuator through a range of operating conditions while holding other actuators constant with interaction terms reflecting the effect of other actuators, determined through limited simulation and interpolation (extrapolation), as described herein.

In some embodiments, results of the sparse set of simulations described herein are used to populate a lookup table or other data structure. The lookup table provides for each actuator at each given actuator parameter(s), e.g., RPM, the forces and moments generated by that actuator under the given (current) operating state ($\alpha_i$, $\beta_i$), and interaction terms for the effect of the actuator under those conditions on other actuators. The combined lookup values for all actuators are combined to determine an overall set of forces and moments for a given set of actuators under the given (current) operating state. In various embodiments, the combine lookup values are used by an onboard flight control system, such as flight control system 100 of FIG. 1, to determine and select an optimal or nearly optimal set of actuators and corresponding parameters to achieve a set of desired forces and moments to be applied to the aircraft.

Figure 7:
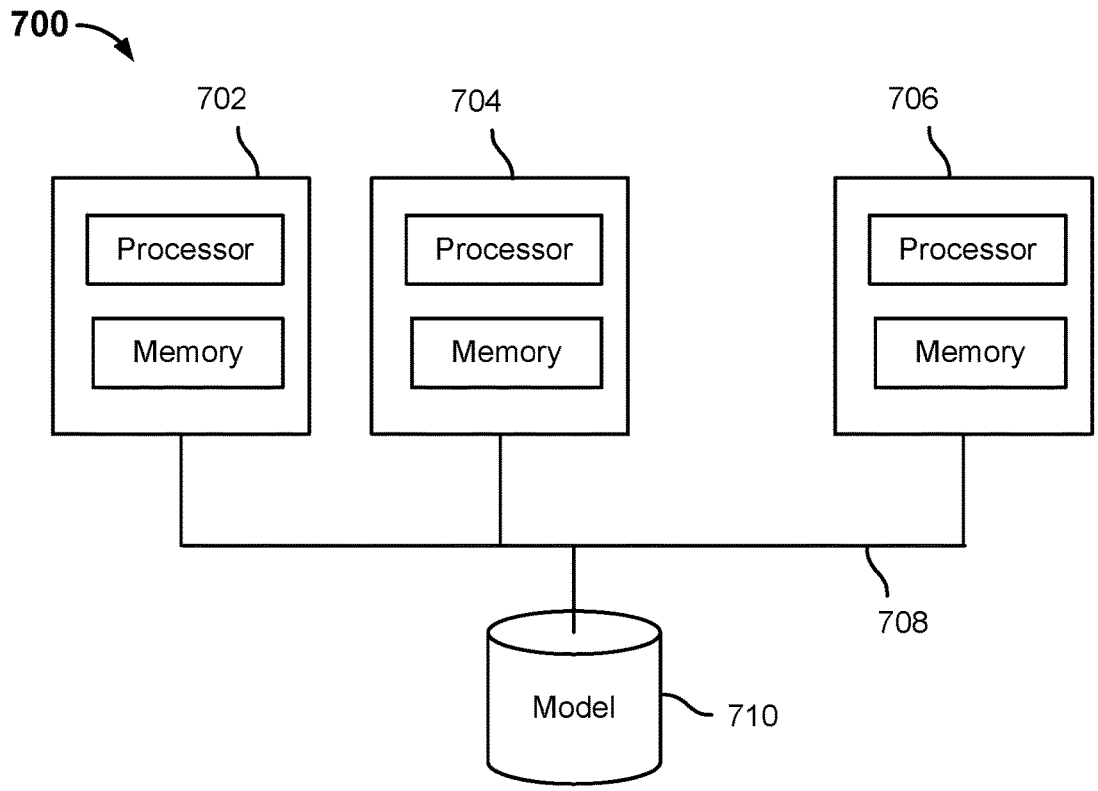
FIG. 7 is a block diagram chart illustrating an embodiment of a distributed computer system to generate an aerodynamic model.

FIG. 7 is a block diagram chart illustrating an embodiment of a distributed computer system to generate an aerodynamic model. In various embodiments, distributed system 700 may be used to perform CFD and/or other simulations as disclosed herein, and/or to generate a comprehensive aerodynamic model based on such simulations, as disclosed herein. In the example shown, distributed system 700 includes a plurality of processing systems, represented in FIG. 7 by systems 702, 704, and 706. In this example, each processing system, such as systems 702, 704, and 706, includes a processor and associated memory. The processing systems 702, 704, and 706 are connected via a network and/or other connection (e.g., bus, backplane, etc.) 708 to a data store 710 configured to store simulation results and aerodynamic model data structures generated as disclosed herein, e.g., one or more lookup tables.

Figure 8:
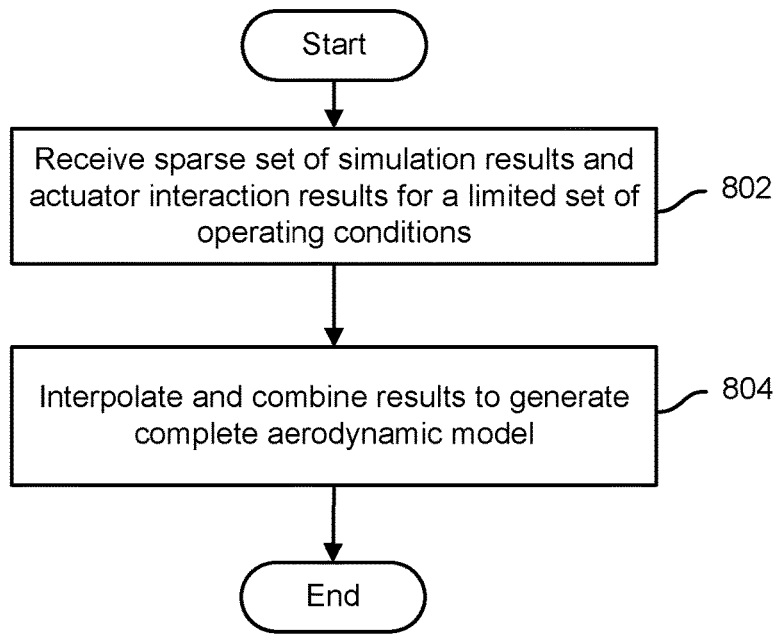
FIG. 8 is a flow chart illustrating an embodiment of a process to generate an aerodynamic model.

FIG. 8 is a flow chart illustrating an embodiment of a process to generate an aerodynamic model. In some embodiments, one or all of the steps comprising processes disclosed herein may be performed programmatically, in whole or in part. For example, in some embodiments, the distributed system 700 of FIG. 7 may be programmed to perform the process of FIG. 8. In the example shown, a sparse set of simulation results is received (802). For example, CFD or other analyses that simulate the interaction of an actuator with other actuators and/or structures at a limited set of operating conditions, as in step 502 of FIG. 5, may be generated and/or received. In this example, the received results are combined programmatically with other simulation results, such as a simple model generated as by the process of FIG. 4, to generate at least partly programmatically a comprehensive aerodynamic model (804). In some embodiments, interpolated (extrapolated) interaction terms are computed at least in part programmatically to populate a lookup table or other data structure with interaction terms beyond those determined through simulation.

In various embodiments, techniques disclosed herein enable an operational aircraft and/or prototype to be deployed more quickly and with less expense than under prior approaches. In some embodiments, computational resources, such as those of the distributed system 700 of FIG. 7, are conserved and used more efficiently, enable a comprehensive aerodynamic model to be generated with a minimal number of CFD or other simulations having to be run.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method to generate an aerodynamic model, comprising:
    performing for each actuator in a plurality of actuators comprising an aircraft a first set of simulations by varying one or more actuator parameters of the actuator through an operating range of the actuator while holding other actuators in the set steady at a baseline value;
    performing a second set of simulations to determine interactions between the actuator and said other actuators under each of a second set of operating conditions; and
    combining respective results of the first and second sets of simulations to generate the aerodynamic model.

2. The method of claim 1, wherein the second set of simulations is performed with respect to a subset of operating conditions in a range of operating conditions with which the aerodynamic model is associated.

3. The method of claim 2, further comprising doing one or both of interpolating and extrapolating to generate interaction data for operating conditions not simulated in the second set of simulations.

4. The method of claim 2, wherein the operating conditions include an aircraft angle of attack $\alpha$.

5. The method of claim 2, wherein the operating conditions include a side wind direction $\beta$.

6. The method of claim 2, wherein the subset of operating conditions comprises a subset of the range of operating conditions.

7. The method of claim 2, wherein the subset of operating conditions comprises fewer than ten elements of the range set of operating conditions.

8. The method of claim 2, wherein the subset of operating conditions comprises two elements of the range of operating conditions.

9. The method of claim 2, wherein the aerodynamic model is based at least in part on interaction factors determined by one or both of interpolation and extrapolation for operating points included in the first set of operating conditions but not included in the second set of operating conditions.

10. The method of claim 1, wherein the aerodynamic model comprises a lookup table.

11. A computer program product to generate an aerodynamic model, the computer program product being embodied in a tangible computer readable storage medium and comprising computer instructions for:
    performing for each actuator in a plurality of actuators comprising an aircraft a first set of simulations by varying one or more actuator parameters of the actuator through an operating range of the actuator while holding other actuators in the set steady at a baseline value;
    performing a second set of simulations to determine interactions between the actuator and said other actuators under each of a second set of operating conditions; and
    combining respective results of the first and second sets of simulations to generate the aerodynamic model.

12. The computer program product of claim 11, wherein the second set of simulations is performed with respect to a subset of operating conditions in a range of operating conditions with which the aerodynamic model is associated.

13. The computer program product of claim 12, further comprising computer instructions for doing one or both of interpolating and extrapolating to generate interaction data for operating conditions not simulated in the second set of simulations.

14. The computer program product of claim 12, wherein the operating conditions include an aircraft angle of attack $\alpha$.

15. The computer program product of claim 12, wherein the operating conditions include a side wind direction $\beta$.

16. The computer program product of claim 12, wherein the subset of operating conditions comprises a subset of the range of operating conditions.

17. The computer program product of claim 12, wherein the subset of operating conditions comprises fewer than ten elements of the range set of operating conditions.

18. The computer program product of claim 12, wherein the subset of operating conditions comprises two elements of the range of operating conditions.

19. The computer program product of claim 12, wherein the aerodynamic model is based at least in part on interaction factors determined by one or both of interpolation and extrapolation for operating points included in the first set of operating conditions but not included in the second set of operating conditions.

20. The computer program product of claim 12, wherein the aerodynamic model comprises a lookup table.

* * * * *